US012562300B2

(12) United States Patent
Wang

(10) Patent No.: US 12,562,300 B2
(45) Date of Patent: Feb. 24, 2026

(54) LOW-LOSS INDUCTOR AND MANUFACTURING METHOD THEREOF

(71) Applicant: HONG DANG Technology Co., Ltd., New Taipei (TW)

(72) Inventor: Qing-Wen Wang, Guangdong (CN)

(73) Assignee: HONG DANG Technology Co., Ltd., New Taipei (TW)

( * ) Notice: Subject to any disclaimer, the term of this patent is extended or adjusted under 35 U.S.C. 154(b) by 729 days.

(21) Appl. No.: 18/089,124

(22) Filed: Dec. 27, 2022

(65) Prior Publication Data

US 2024/0062944 A1 Feb. 22, 2024

(30) Foreign Application Priority Data

Aug. 22, 2022 (TW) ................................ 111131577

(51) Int. Cl.

| | |
|---|---|
| ***H01F 27/255*** | (2006.01) |
| ***C08K 3/36*** | (2006.01) |
| ***C09D 5/08*** | (2006.01) |
| ***C09D 7/40*** | (2018.01) |
| ***C09D 7/61*** | (2018.01) |
| ***C09D 163/00*** | (2006.01) |
| ***H01F 1/147*** | (2006.01) |
| ***H01F 1/153*** | (2006.01) |
| ***H01F 1/20*** | (2006.01) |
| ***H01F 1/28*** | (2006.01) |
| ***H01F 1/33*** | (2006.01) |
| ***H01F 17/04*** | (2006.01) |
| ***H01F 27/29*** | (2006.01) |
| ***H01F 27/32*** | (2006.01) |
| ***H01F 41/00*** | (2006.01) |

(Continued)

(52) U.S. Cl.

CPC ....... *H01F 27/255* (2013.01); *H01F 1/15308* (2013.01); *H01F 1/15341* (2013.01); *H01F 1/28* (2013.01); *H01F 1/33* (2013.01); *H01F 41/005* (2013.01); *H01F 41/0246* (2013.01)

(58) Field of Classification Search

None

See application file for complete search history.

(56) References Cited

U.S. PATENT DOCUMENTS

| | | | | |
|---|---|---|---|---|
| 2016/0247626 A1* | 8/2016 | Kawarai | ............ | H01F 27/2823 |
| 2018/0108465 A1* | 4/2018 | Takahashi | .......... | H01F 1/15333 |

* cited by examiner

*Primary Examiner* — Ha S Nguyen

(74) *Attorney, Agent, or Firm* — MUNCY, GEISSLER, OLDS & LOWE, P.C.

(57) ABSTRACT

An inductor has a main magnet core, a coil mounted around the main magnet core, and a residual magnet encapsulating the main magnet core and partially encapsulating the coil. The main magnet core is made of a main magnet core powder containing amorphous iron base material and nickel base material powders. The residual magnet is made of a residual magnet powder containing a main magnet powder and a soft magnet powder including an iron-silicon-chromium alloy powder and a carbonyl iron powder. Thus, through a low-loss feature of the amorphous iron base material and nickel base material powders, a loss of the main magnet core is reduced. Furthermore, a magnetic permeability of the residual magnet matches a magnetic permeability of the main magnet core. A magnetic leakage is further avoided, and the alternating current resistance is reduced. A quality factor and a conversion efficiency are enhanced.

19 Claims, 6 Drawing Sheets

(51) Int. Cl.
*H01F 41/02* (2006.01)
*H01F 41/04* (2006.01)

LOW-LOSS INDUCTOR AND MANUFACTURING METHOD THEREOF

CROSS-REFERENCE TO RELATED APPLICATIONS

This application is based upon and claims priority under 35 U.S.C. 119 from Taiwan Patent Application No. 111131577 filed on Aug. 22, 2022, which is hereby specifically incorporated herein by this reference thereto.

BACKGROUND OF THE INVENTION

1. Field of the Invention

The present invention is related to an inductor and manufacturing method thereof, especially to a low-loss inductor and manufacturing method thereof.

2. Description of the Prior Arts

With continuous changes in technical requirements, an inductor disposed on a circuit to be as an on-off switch needs to have a lower loss and a higher conversion efficiency. A conventional inductor in accordance with the prior arts is made of a magnet alloy composite material, is disposed in a die, is pressed by a high pressure, and is formed through molding. However, during a press-molding process to form an outer magnet of the conventional inductor, a coil encapsulated by the outer magnet is also pressed by high pressure. Thus, the coil may be deformed or broken resulting in a short circuit. Therefore, a turn number of the coil of the conventional inductor has to be correspondingly increased to enhance a strength and to avoid deformation or broken. However, increasing the turn number of the coil correspondingly increases a direct current resistance to result in an excessive overall loss.

Another conventional inductor in accordance with the prior arts uses two different magnet alloy composite materials and is manufactured through secondary molding by two different dies. Although a partial magnet density of the conventional inductor is enhanced, the magnetic permeabilities of the magnet alloy composite materials are quite different from each other and may result in a magnet leakage. Thus, an alternating current resistance is further increased, and the overall loss is still excessive.

With the foregoing description, the conventional inductor needs to be improved to decrease the magnet leakage and the loss.

SUMMARY OF THE INVENTION

An objective of the present invention is to provide a low-loss inductor and manufacturing method thereof.

To achieve the objection mentioned above, the low-loss inductor includes:

- a main magnet core including a main magnet core powder containing:
  - an amorphous iron base material powder, wherein a mass percent of the amorphous iron base material powder is 89.7 to 92.35% of iron (Fe), 4 to 5% of silicon (Si), 3.5 to 4% of boron (B), 0.05 to 0.5% of phosphorus (P), and 0.1 to 0.8% of carbon (C); and
  - an amorphous nickel base material powder, wherein a mass percent of the nickel base material powder is 60.5 to 67.7% of nickel (Ni), 25 to 28% of iron (Fe), 3.5 to 5% of boron (B), 3.5 to 5% of silicon (Si), and 0.3 to 1.5% of phosphorus (P);
- a coil mounted around the main magnet core; and
- a residual magnet encapsulating the main magnet core, partially encapsulating the coil, and including a residual magnet powder containing:
  - a main magnet powder, wherein a mass percent of the main magnet powder is 72.7 to 83.7% of iron (Fe), 8 to 11% of nickel (Ni), 3 to 5% of cobalt (Co), 3 to 6% of silicon (Si), 2 to 4% of boron (B), 0.2 to 0.8% of phosphorus (P), and 0.1 to 0.5% of niobium (Nb); and
- a soft magnet powder containing an iron-silicon-chromium alloy power and a carbonyl iron powder, wherein a mass percent of the iron-silicon-chromium alloy powder is 90.5 to 93.5% of iron (Fe), 4.5 to 6.5% of silicon (Si), and 2 to 3% of chromium (Cr).

The present invention has following advantages. By using the main magnet core powder containing the amorphous iron base material powder and the amorphous nickel base material powder to manufacture the main magnet core, a high magnetic permeability is maintained and a loss of the main magnet core is reduced because of a low-loss characteristic of an amorphous material. Furthermore, the residual magnet powder containing the soft magnet powder and the main magnet powder is used to manufacture the residual magnet encapsulating the main magnet core and partially encapsulating the coil. A magnetic permeability of the main magnet core matches a magnetic permeability of the residual magnet to reduce an alternating current resistance. Thus, the low-loss inductor in accordance with the present invention has a high quality factor (Q), the loss during the inductor works is indeed reduced, and a conversion efficiency is enhanced.

To achieve the objection mentioned above, the manufacturing method of the low-loss inductor includes steps of:

(a) preparing a main magnet core and fabricating a residual magnet composite material powder, wherein the main magnet core contains a main magnet core powder containing:
  - an amorphous iron base material powder, wherein a mass percent of the amorphous iron base material powder is 89.7 to 92.35% of iron (Fe), 4 to 5% of silicon (Si), 3.5 to 4% of boron (B), 0.05 to 0.5% of phosphorus (P), and 0.1 to 0.8% of carbon (C); and
  - an amorphous nickel base material powder, wherein a mass percent of the amorphous nickel base material powder is 60.5 to 67.7% of nickel (Ni), 25 to 28% of iron (Fe), 3.5 to 5% of boron (B), 3.5 to 5% of silicon (Si), and 0.3 to 1.5% of phosphorus (P); and the residual magnet composite material powder contains a residual magnet powder containing:
  - a main magnet powder, wherein a mass percent of the main magnet powder is 72.7 to 83.7% of iron (Fe), 8 to 11% of nickel (Ni), 3 to 5% of cobalt (Co), 3 to 6% of silicon (Si), 2 to 4% of boron (B), 0.2 to 0.8% of phosphorus (P), and 0.1 to 0.5% of niobium (Nb); and
  - a soft magnet powder containing an iron-silicon-chromium alloy power and a carbonyl iron powder, wherein the mass percent of the iron-silicon-chromium alloy powder is 90.5 to 93.5% of iron (Fe), 4.5 to 6.5% of silicon (Si), and 2 to 3% of chromium (Cr);

(b) mounting a coil on the main magnet core;

(c) disposing the main magnet core with the coil mounted around and the residual magnet composite material powder into a first die, wherein the residual magnet composite material powder encapsulates the main magnet core and partially encapsulates the coil;

(d) hot-pressing the residual magnet composite material powder by the first die to integrally form a residual magnet; and (e) removing the residual magnet from the first die to manufacture an inductor.

With the foregoing description, the manufacturing method in accordance with the present invention fabricates the main magnet core with a low-loss by a low-loss characteristic of the amorphous iron base material powder and the amorphous nickel base material powder. Additionally, the composition of the main magnet core powder is adjustable to maintain a high magnetic permeability of the main magnet core. Furthermore, the main magnet core with the coil mounted around and the residual magnet composite material powder are disposed into the first die. A residual magnet encapsulating the main magnet core is formed with a magnetic permeability of the residual magnet matching a magnetic permeability of the main magnet core so that a magnet leakage is avoided. Accordingly, the manufacturing method ensures that the inductor fabricated has a high quality factor (Q), the loss is further lowered, and a conversion efficiency of the inductor is improved.

DETAILED DESCRIPTION OF THE EMBODIMENTS

With multiple embodiments and drawings thereof, the features of the present invention are described in detail as follows.

Figure 1:
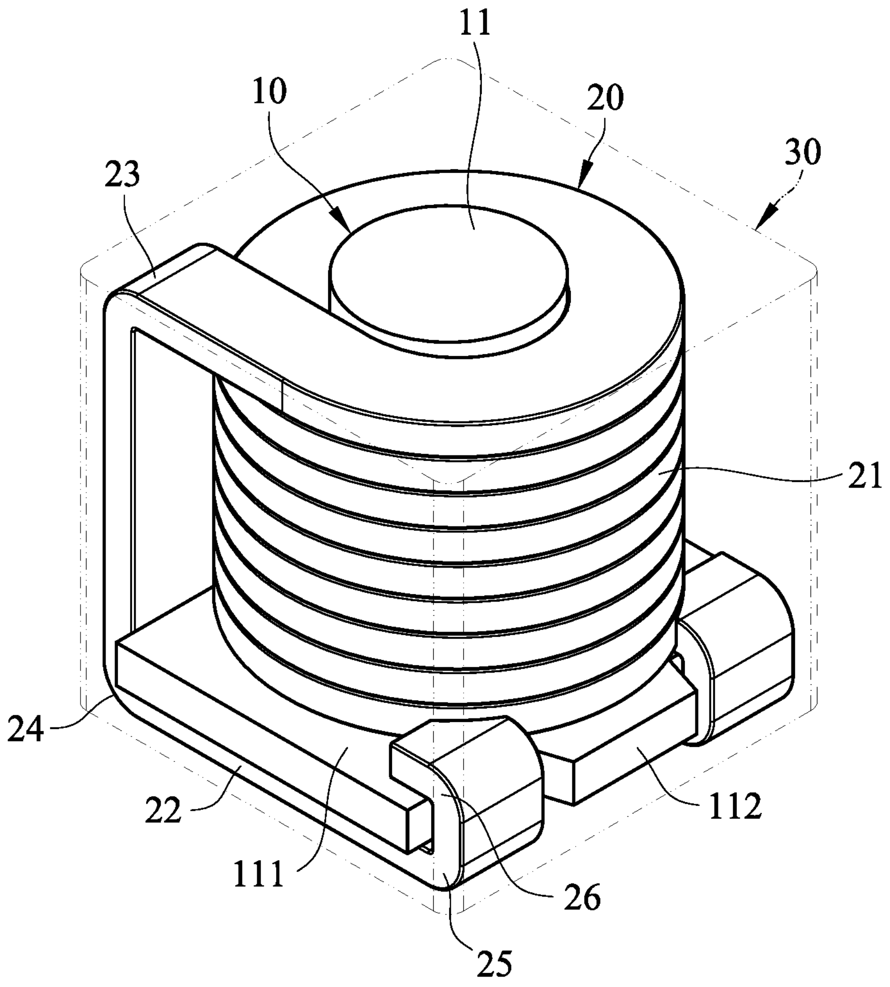
FIG. 1 is a perspective view of a low-loss inductor in accordance with the present invention.
Figure 2:
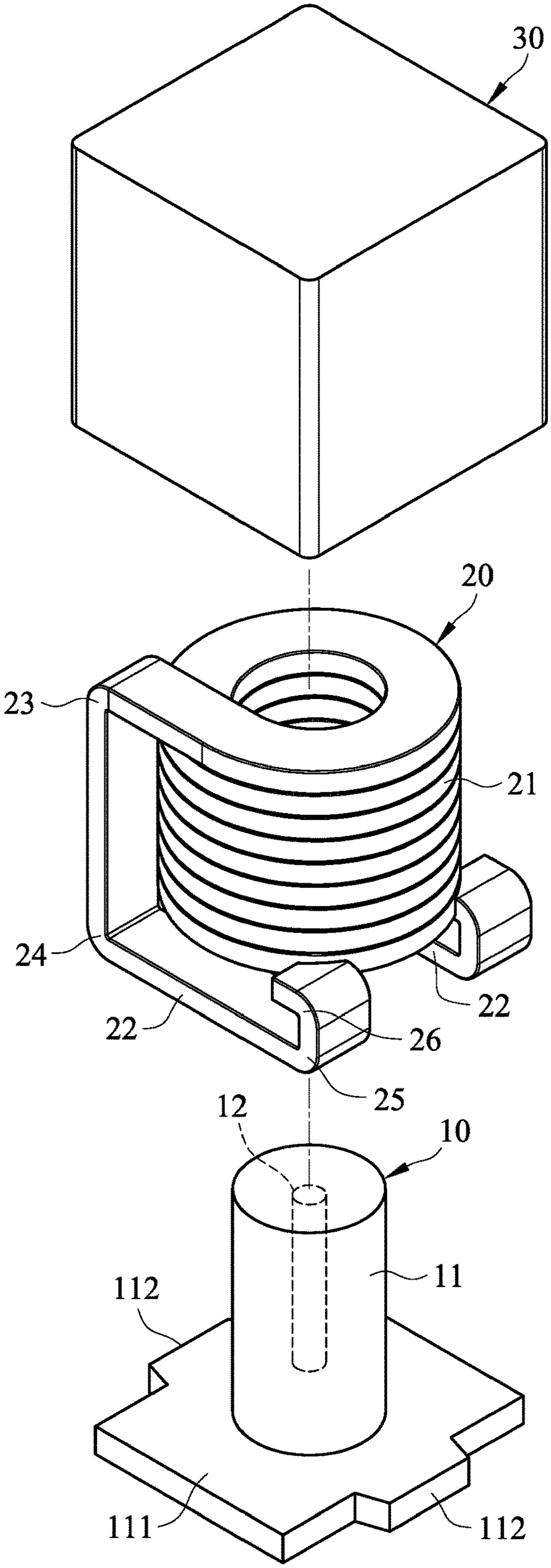
FIG. 2 is an exploded perspective view of the low-loss inductor in FIG. 1.

With reference to FIGS. 1 and 2, a low-loss inductor in accordance with the present invention comprises a main magnet core 10, a coil 20, and a residual magnet 30.

The main magnet core 10 has a main pillar 11. In the present embodiment, a base 111 integrally extends from an end of the main pillar 11. A shape of the base 111 is substantially rectangular. Two concave portions 112 are respectively protruding from two opposite sides of the base 111. In one embodiment, the main magnet core 10 further has a central pillar 12 encapsulated by the main pillar 11 and mounted inside an upper portion of the main pillar 11.

The main magnet core 10 is substantially made by a main magnet core powder containing an amorphous iron base material powder and an amorphous nickel powder. A mass percentage of the amorphous iron base material powder in the main magnet core powder is 70 to 90%. A mass percent of the amorphous iron base material powder is 89.7 to 92.35% of iron (Fe), 4 to 5% of silicon (Si), 3.5 to 4% of boron (B), 0.05 to 0.5% of phosphorus (P) and 0.1 to 0.8% of carbon (C). A mass percentage of the amorphous nickel base material powder in the main magnet core powder is 10 to 30%. A mass percent of the amorphous nickel base material powder is 60.5 to 67.7% of nickel (Ni), 25 to 28% of iron (Fe), 3.5 to 5% of boron (B), 3.5 to 5% of silicon (Si), and 0.3 to 1.5% of phosphorus (P). In the present embodiment, the main magnet core is mixed with a thermosetting resin to form the main magnet core 10. The thermosetting resin may be made of an unsaturated polyester resin thermal crosslinked by a bisphenol A diglycidyl ether and a 4,4'-dihydroxydiphenylmathane, but the composition of the thermosetting resin is not limited thereto.

The coil 20 is mounted around the main magnet core 10 and is formed by winding a bare metal wire. In the present embodiment, the coil 20 comprises a winding portion 21 and two electrodes 22. The winding portion 21 is sleeved on the main pillar 11 of the main magnet core 10. The bare metal wire may be a flat bare metal wire A turn number of the winding portion 21 of the coil 20 may be nine turns, but is not limited thereto. Two end portions of the coil 20 are bent and fastened on the base 111 of the main magnet core 10 to integrally form the electrodes 22. In one embodiment, the low-loss inductor may be a surface mount device so that a solder layer 221 is formed on a bottom surface of each electrode 22. In one embodiment, the thickness of the solder layer 221 may be 15 to 25 μm, but is not limited thereto.

Figure 3:
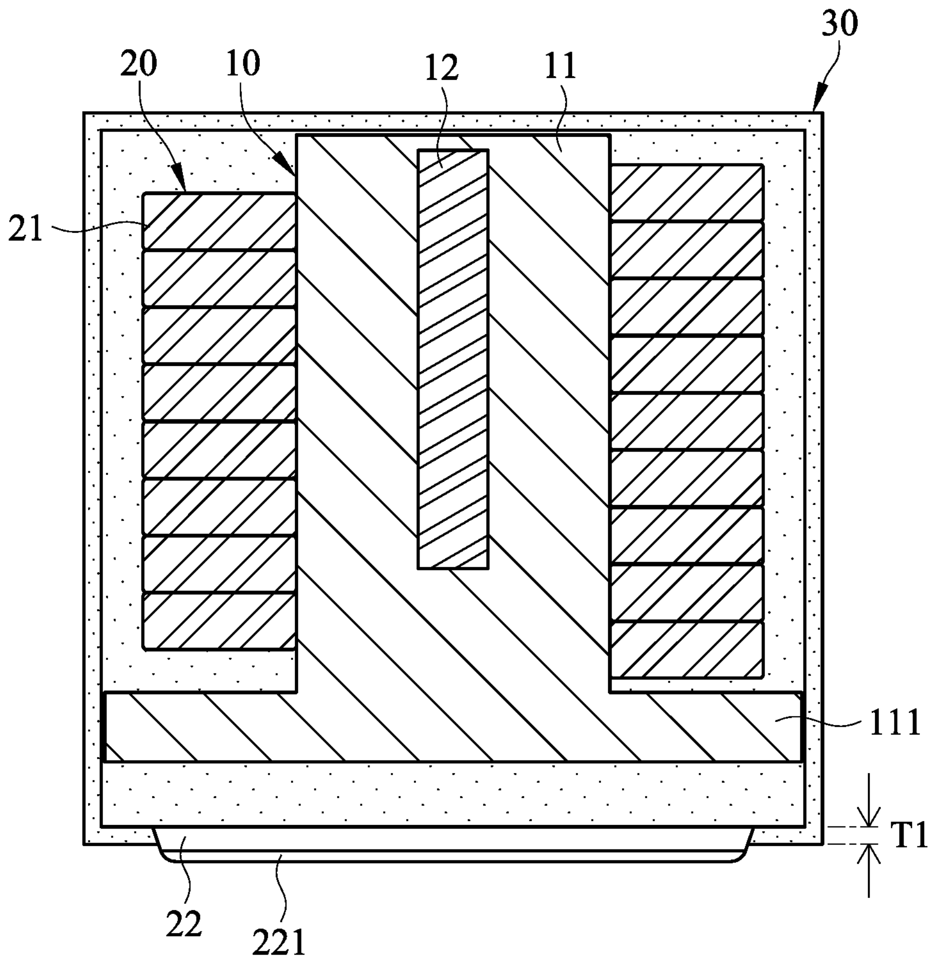
FIG. 3 is a cross-sectional view along the A-A line in FIG. 1.

The residual magnet 30 encapsulates the main magnet core 10 and partially encapsulates the coil 20. Specifically, as shown in FIG. 3, the residual magnet 30 encapsulates the main magnet core 10 and the winding portion 21 of the coil 20, and partially encapsulates the ends of the winding portion 21 to expose the electrodes 22 and the solder layer 221 of the coil 20. In the present embodiment, the residual magnet 30 comprises an insulation rust-proof layer 31 formed on an outer surface of the residual magnet 30. The insulation rust-proof layer 31 comprises an epoxy resin and a nano-silicon powder. A mass percentage of the epoxy resin in the insulation rust-proof layer 31 is 80%, and a mass percentage of the nano-silicon power in the insulation rust-proof layer is 20%. In one embodiment, a thickness of the insulation rust-proof layer 31 may be 10 to 20 μm.

The residual magnet 30 is substantially made by a residual magnet powder containing a main magnet powder and a soft magnet powder. A mass percentage of the main magnet powder in the residual magnet powder is 59 to 67%. A mass percent of the main magnet powder is 72.7 to 83.7% of iron (Fe), 8 to 11% of nickel (Ni), 3 to 5% of cobalt (Co), 3 to 6% of silicon (Si), 2 to 4% of boron (B), 0.2 to 0.8% of phosphorus (P), and 0.1 to 0.5% of niobium (Nb). A mass percentage of the soft magnet powder in the residual magnet powder is 33 to 41%. The soft magnet powder contains an iron-silicon-chromium alloy powder (hereinafter referred to as "Fe—Si—Cr alloy powder") and a carbonyl iron powder. A mass percentage of the Fe—Si—Cr alloy powder in the soft magnet powder is 17 to 33%. A mass percent of the Fe—Si—Cr alloy powder is 90.5 to 93.5% of iron (Fe), 4.5 to 6.5% of silicon (Si), and 2 to 3% of chromium (Cr). A mass percentage of the carbonyl iron powder in the soft magnet powder is 67 to 83%. In the present embodiment, the residual magnet 30 is made of the residual magnet powder mixed with a thermosetting resin. The thermosetting resin may be made of an unsaturated polyester resin thermal crosslinked by a bisphenol A diglycidyl ether and a 4,4'-dihydroxydiphenylmathane, but the composition of the thermosetting resin is not limited thereto.

In the present embodiment, the residual magnet 30 further comprises a silica. Specifically, the silica is made by mixing a fumed silica in the thermosetting resin through a silane coupling agent.

Figure 4:
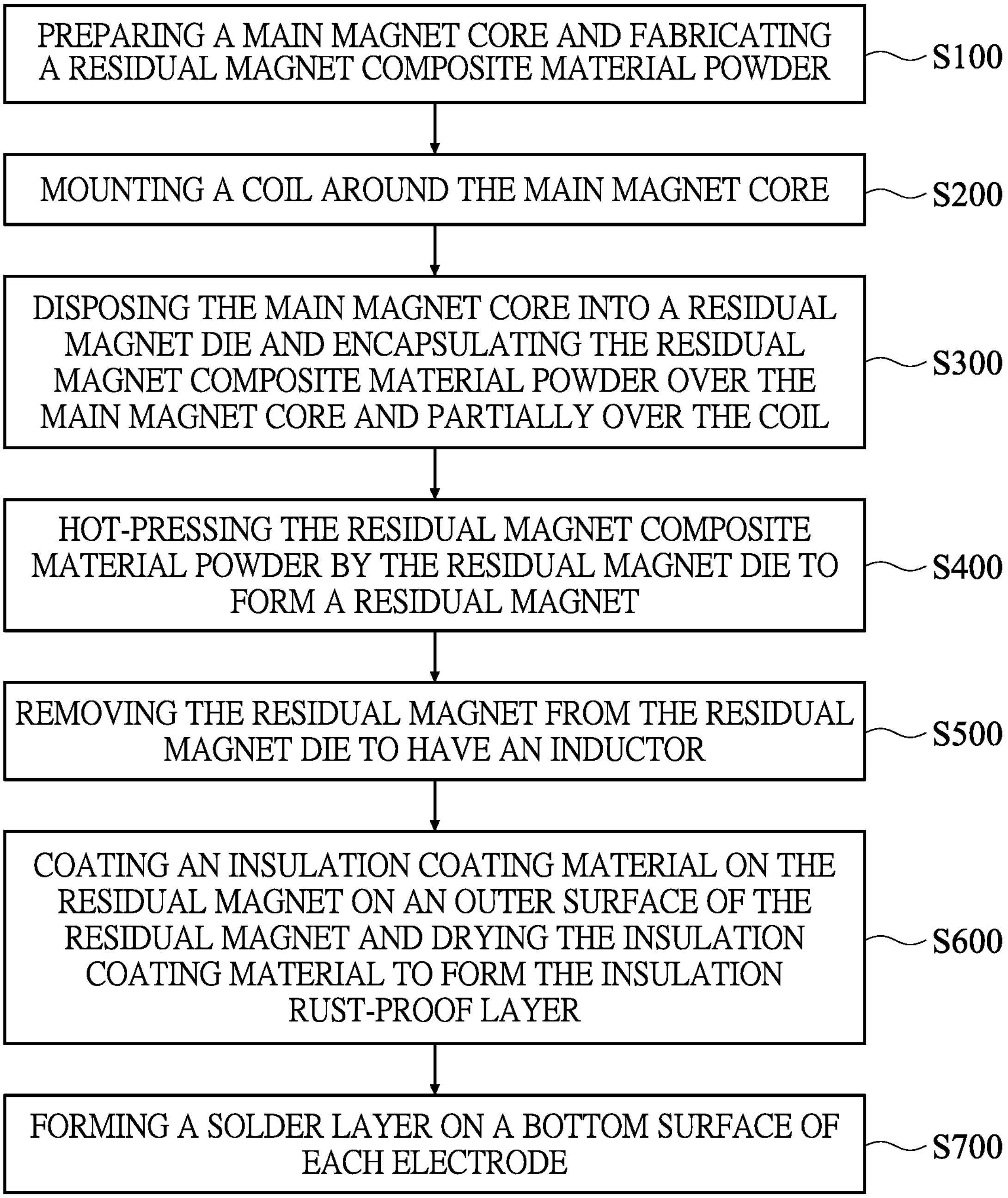
FIGS. 4 to 6 illustrate flow diagrams of manufacturing method steps for a low-loss inductor in accordance with the present invention.
Figure 5:
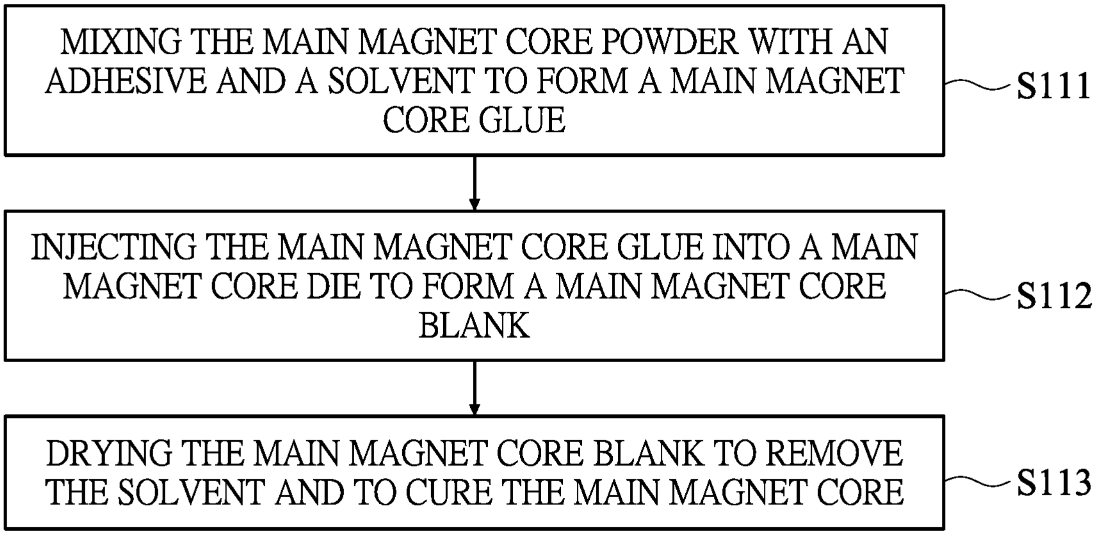
Figure 6:
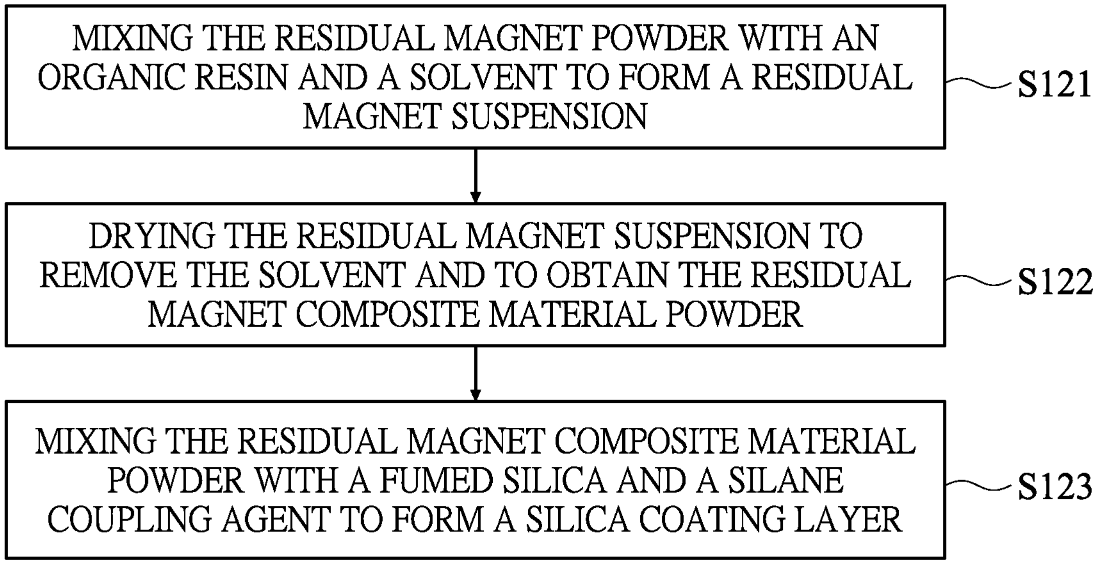

The material and the structure of the low-loss inductor are introduced as described above, and a manufacturing method of the low-loss inductor in accordance with the present invention is further introduced as follows. As shown in FIGS. 4 to 6, the manufacturing method mainly comprises steps of S100 to S500 described as follows and may further comprise steps of S600 and S700.

With reference to FIG. 4, in the step S100, a main magnet core is prepared, and a residual magnet is fabricated. The main magnet core contains a main magnet core powder containing an amorphous iron base material powder and an amorphous nickel base material powder. A mass percentage of the amorphous iron base material powder in the main magnet core powder is 70 to 90%. A mass percent of the amorphous iron base material powder is 89.7 to 92.35% of iron (Fe), 4 to 5% of silicon (Si), 3.5 to 4% of boron (B), 0.05 to 0.5% of phosphorus (P), and 0.1 to 0.8% of carbon (C). A mass percentage of the amorphous nickel base material powder in the main magnet core powder is 10 to 30%. A mass percent of the amorphous nickel base material powder is 60.5 to 67.7% of nickel (Ni), 25 to 28% of iron (Fe), 3.5 to 5% of boron (B), 3.5 to 5% of silicon (Si), and 0.3 to 1.5% of phosphorus (P). In the present embodiment, a granularity of the amorphous iron base material powder may be 5 to 15 μm, and a granularity of the amorphous nickel base material powder maybe 10 to 20 μm.

Simultaneously, in the step S100, the residual magnet composite material powder contains a residual magnet powder containing a main magnet powder and a soft magnet powder. A mass percentage of the main magnet powder in the residual magnet powder is 59 to 67%. A mass percent of the main magnet powder is 72.7 to 83.7% of iron (Fe), 8 to 11% of nickel (Ni), 3 to 5% of cobalt (Co), 3 to 6% of silicon (Si), 2 to 4% of boron (B), 0.2 to 0.8% of phosphorus (P), and 0.1 to 0.5% of niobium (Nb). A mass percentage of the soft magnet powder in the residual magnet powder is 33 to 41%, and the soft magnet powder contains an iron-silicon-chromium alloy powder (hereinafter referred to as "Fe—Si—Cr alloy powder") and a carbonyl iron powder. A mass percentage of the Fe—Si—Cr alloy powder in the soft magnet powder is 17 to 33%. A mass percent of the Fe—Si—Cr alloy powder is 90.5 to 93.5% of iron (Fe), 4.5 to 6.5% of silicon (Si), and 2 to 3% of chromium (Cr). A mass percentage of the carbonyl iron powder in the soft magnet powder is 67 to 83%. In the present embodiment, a granularity of the main magnet powder may be 15 to 25 μm, and a granularity of the soft magnet powder may be 1 to 3 μm.

In the present embodiment, the step S100 comprises steps S111 to S113 and steps S121 to S123 described as follows. The steps S111 to S113 are the preparation steps of the main magnet core. The steps S121 to S123 are the fabrication steps of the residual magnet composite material powder.

With reference to FIG. 5, in the step S111, the main magnet core powder is mixed with an adhesive and a solvent to form a main magnet core glue. In the present embodiment, the adhesive contains an unsaturated polyester resin (hereinafter referred to as "UPR"), a bisphenol A diglycidyl ether (hereinafter referred to as "BADGE"), and a 4,4'-dihydroxydiphenylmethane (also known as bisphenol F, hereinafter referred to as "BPF"), but the materials of the adhesive are not limited thereto. A mass percentage of the UPR of the adhesive in the main magnet core glue is 0.1 to 0.3%. A mass percentage of the BADGE of the adhesive in the main magnet core glue is 0.8 to 1.2%. A mass percentage of the BPF of the adhesive in the main magnet core glue is 0.2 to 0.4%. the BADGE and the BPF of the adhesive are used as a thermal crosslinker to crosslink and solidify the UPR. The solvent may be a mixture of a cyclohexanone and an acetone, but is not limited thereto. The mass percentages of the cyclohexanone and the acetone in the main magnet core glue are 5 to 10%. The cyclohexanone and the acetone are used to dissolve the UPR, the BADGE, and the BPF, and to disperse the main magnet core powder therein. Thus, the main magnet core powder is cohered through and coated by the adhesive to form the main magnet core glue.

In the step S112, the main magnet core glue is injected into a main magnet core die to integrally form a main magnet core blank. In the present embodiment, the main magnet core is pressed and formed by a high pressure. Specifically, the main magnet core glue is pressed by a pressure of 500 to 900 MPa in the main magnet core die to start to crosslink the UPR by the BADGE and the BPF of the adhesive to form a thermosetting resin. Then the main magnet core glue is gradually solidified and integrally formed the main magnet core glue. In one embodiment, a central pillar is further disposed in the main magnet core die and located at an upper portion therein, and the main magnet core glue encapsulates the main pillar to form the main magnet core blank.

In the step S113, the main magnet core blank is dried at a temperature of 210° C. for 5 to 10 minutes to remove the solvent and further cure the main magnet core.

With reference to FIG. 6, in the step S121, the residual magnet powder is mixed with an organic resin and a solvent to form a residual magnet suspension. In the present embodiment, the organic resin contains the UPR, the BADGE, and the BPF, but the materials of the organic resin are not limited thereto. A mass percentage of the UPR of the organic resin in the residual magnet suspension is 0.05 to 0.15%. A mass percentage of the BADGE of the organic resin in the residual magnet suspension is 0.5 to 0.7%. A mass percentage of the BPF of the organic resin in the residual magnet suspension is 0.1 to 0.2%. The BADGE and the BPF of the organic resin are also used as a thermal crosslinker to crosslink and solidify the UPR. The solvent may be a mixture of a cyclohexanone and an acetone, but is not limited thereto. A mass percentage of the cyclohexanone in the residual magnet suspension is 7 to 15%. A mass percentage of the acetone in the residual magnet suspension is 2 to 5%. The cyclohexanone and the acetone are also used as dissolving the UPR, the BADGE, and the BPF, and dispersing the residual magnet powder therein. Thus, the residual magnet powder is cohered through and coated by the organic resin to form the residual magnet suspension.

In the step S122, the residual magnet suspension is dried to remove the solvent. Compared to the mass percentage of the adhesive in the main magnet core, a mass percentage of the organic resin containing the UPR, the BADGE, and the BPF in the residual magnet suspension is much lower. In other words, a viscosity of the residual magnet suspension is lower than a viscosity of the main magnet core glue. After drying, a residual magnet powder with a thermosetting organic resin coated on an outer surface thereof is obtained, which is the residual magnet composite material powder.

In the step S123, the residual magnet composite material powder is mixed with a fumed silica and a silane coupling agent to form a silica coating layer. A mass percentage of the fumed silica in the residual magnet composite material powder is 0.05 to 0.2%. A granularity of the fumed silica may be 15 to 30 nm. A mass percentage of the silane coupling agent in the residual magnet composite material powder is 0.1 to 0.5%. In the present embodiment, a thickness of the silica coating layer is 10 to 20 nm. Due to the residual magnet composite material powder has a structure in which the residual magnet powder is coated by the organic resin, the silane coupling agent is used as binding the fumed silica and the organic resin to strengthen a force of hetero-bonding between the silica coating layer and the organic resin. A disintegration of the silica coating layer is avoided, the fumed silica does not detach from the organic resin.

With reference to FIG. 4, in the step S200, a coil is mounted around the main magnet core. In the present embodiment, a winding portion of the coil is sleeved on a main pillar of the main magnet core, and two end portions of the coil are bent and fastened on a base of the main magnet core. As shown in FIG. 1, the end portions of the coil 20 are respectively bent and fastened on two opposite sides of the concave portions 112 of the base 111. Four bent portions are formed by four bends of the end portions of the winding portion 21 of the coil 20. The view direction of FIG. 1 and one of the end portions connected to a topmost turn of the winding portion 21 are used for an example. Firstly, the end portion extends backward and is bent downward to form a first bent portion 23. Secondly, the end portion is further bent forward along a lower side of the base 111 of the main magnet core 10 to form a second bent portion 24. Thirdly, the end portion is further bent upward along a front side of the base 111 to form a third bent portion 25, and one of the electrodes 22 is defined between the second bent portion 24 and the third bent portion 25. Finally, the end portion is further bent backward along an upper side of the base 111 to form a fourth bent portion 26 and to firmly fastened the coil 20 on the main magnet core 10.

In the step S300, the main magnet core with the coil mounted around and the residual magnet composite material powder are disposed into a residual magnet die. The residual magnet composite material powder encapsulates the main magnet core powder and partially encapsulates the coil. Specifically, the residual magnet composite material powder encapsulates the winding portion of the coil to expose the electrodes of the coil.

In the step S400, the residual magnet composite material powder is hot-pressed by the residual magnet die to integrally form a residual magnet. In the present embodiment, the residual magnet composite material powder is hot-pressed at a pressure of 150 to 300 MPa and a temperature of 100 to 150° C. in the residual magnet die to begin a crosslinking of the UPR by the BADGE and the BPF of the organic resin. The silica coating layer coated on an outer surface of the residual magnet composite material powder is pressed to connect through the high pressure to enhance an insulation ability of the residual magnet.

In the step S500, the residual magnet is removed from the residual magnet die to have the low-loss inductor.

In the step S600, an insulation coating material is coated on an outer surface of the residual magnet and dried to form the insulation rust-proof layer 31 as shown in FIG. 3. In the present embodiment, the insulation coating material comprises an N-methyl-2-pyrrolidone (hereinafter referred to as "NMP"), an epoxy resin, and a nano-silicon powder. A mass percentage of the NMP in the insulation coating material is 90 to 95%. A mass percentage of the epoxy resin in the insulation coating material is 4 to 8%. A mass percentage of the nano-silicon powder is 1 to 2%, and a granularity of the nano-silicon powder may be 80 to 120 nm. A thickness of the insulation rust-proof layer 31 may be 10 to 20 μm. The NMP is used as a solvent to dissolve the epoxy resin and disperse the nano-silicon therein, but the composition of the insulation coating material is not limited thereto.

In the step S700, a solder layer 221 as shown in FIG. 3 is formed on a bottom surface of each electrode. A thickness of the solder layer 221 may be 15 to 25 μm. In one embodiment, the low-loss inductor may be a surface mount device, so the solder layer is used to weld the low-loss inductor to a corresponding contact of a circuit board (not shown).

The materials, the structures, and the manufacturing method of the low-loss inductor are introduced as the foregoing description of the embodiments. Three different experimental groups of the low-loss inductor based on the material and the manufacturing method are introduced as follows. A control group of an inductor is also introduced as follows. A main magnet core and a residual magnet of the inductor of the control group are made of a conventional material and a conventional manufacturing method in accordance with the prior arts. In the three experimental groups, the steps S122, S200, S300, and S500 are the same as the foregoing description of the embodiments and does not introduce hereinafter.

Experimental Group 1

In the experimental group 1, a mass percentage of the amorphous iron base material powder in the main magnet core powder is 70%. A mass percent of the amorphous iron base material powder is 92.35% of iron (Fe), 4% of silicon (Si), 3.5% of boron (B), 0.05% of phosphorus (P), and 0.1% of carbon (C). A mass percentage of the amorphous nickel base material powder in the main magnet core powder is 30%. A mass percent of the amorphous nickel base material powder is 60.5% of nickel (Ni), 28% of iron (Fe), 5% of boron (B), 5% of silicon (Si), and 1.5% of phosphorus (P). The granularity of the amorphous iron base material powder may be 5 to 15 μm. The granularity of the amorphous nickel base material powder may be 10 to 20 μm.

A mass percentage of the main magnet powder in the residual magnet powder is 59%. A mass percent of the main magnet powder is 83.7% of iron (Fe), 8% of nickel (Ni), 3% of cobalt (Co), 3% of silicon (Si), 2% of boron (B), 0.2% of phosphorus (P), and 0.1% of niobium (Nb). A mass percentage of the soft magnet powder in the residual magnet powder is 41%, and the soft magnet powder contains the Fe—Si—Cr alloy powder and the carbonyl iron powder. A mass percentage of the Fe—Si—Cr alloy powder in the soft magnet powder is 17%. A mass percent of the Fe—Si—Cr alloy powder is 90.5% of iron (Fe), 6.5% of silicon (Si), and 3% of chromium (Cr). A mass percentage of the carbonyl iron powder in the soft magnet powder is 83%. The granularity of the main magnet powder may be 15 to 25 μm. The granularity of the soft magnet powder may be 1 to 3 μm.

In the step S100: the main magnet core is prepared by the main magnet core powder in accordance with the present experimental group, and the residual magnet composite material powder is fabricated by the residual magnet powder in accordance with the present experimental group.

In the step S111: a mass percentage of the UPR in the main magnet core glue is 0.1%. A mass percentage of the BADGE in the main magnet core glue is 1.2%. A mass percentage of the BPF in the main magnet core glue is 0.4%. A mass percentage of the cyclohexanone in the main magnet core glue is 10%. A mass percentage of the acetone in the main magnet core glue is 5%.

In the step S112: the main magnet core glue is pressed at a pressure of 900 MPa in the main magnet core die to solidify the UPR and form the main magnet core blank.

In the step S113: the main magnet core blank is dried at a temperature of 210° C. for 5 minutes to remove the cyclohexanone and the acetone and further cure the main magnet core.

In the step S121: a mass percentage of the UPR in the residual magnet suspension is 0.15%. A mass percentage of the BADGE in the residual magnet suspension is 0.7%. A mass percentage of the BPF in residual magnet suspension is 0.2%. A mass percentage of the cyclohexanone in the residual magnet suspension is 15%. A mass percentage of the acetone in the residual magnet suspension is 5%.

In the step S123: a mass percentage of the fumed silica in the residual magnet composite material powder is 0.2%, and the granularity of the fumed silica is 30 nm. A mass percentage of the silane coupling agent in the residual magnet composite material powder is 0.5%. In the present experimental group, a thickness of the silica coating layer is 20 nm.

In the step S400: the residual magnet composite material powder is hot-pressed at a pressure of 150 MPa and a temperature of 100° C. in the residual magnet die to integrally form the residual magnet by the residual magnet composite material powder.

In the step S600: a mass percentage of the NMP in the insulation coating material is 95%. A mass percentage of the epoxy resin in the insulation coating material is 4%. A mass percentage of the nano-silicon powder in the insulation coating material is 1%, and the granularity of the nano-silicon powder is 80 nm. In the present experimental group, a thickness of the insulation rust-proof layer is 20 μm.

In the step S700: a thickness of the solder layer formed on the bottom surface of each electrode is 25 μm.

Experimental Group 2

In the experimental group 2, a mass percentage of the amorphous iron base material powder in the main magnet core powder is 90%. A mass percent of the amorphous iron base material powder is 89.7% of iron (Fe), 5% of silicon (Si), 4% of boron (B), 0.5% of phosphorus (P), and 0.8% of carbon (C). A mass percentage of the amorphous nickel base material powder in the main magnet core powder is 10%. A mass percent of the amorphous nickel base material powder is 67.7% of nickel (Ni), 25% of iron (Fe), 3.5% of boron (B), 3.5% of silicon (Si), and 0.3% of phosphorus (P). The granularities of the amorphous iron base material and the amorphous nickel base material powder are the same as the experimental group 1.

A mass percentage of the main magnet powder in the residual magnet powder is 67%. A mass percent of the main magnet powder contains 72.7% of iron (Fe), 11% of nickel (Ni), 5% of cobalt (Co), 6% of silicon (Si), 4% of boron (B), 0.8% of phosphorus (P), and 0.5% of niobium (Nb). A mass percentage of the soft magnet powder in the residual magnet powder is 33%, and the soft magnet powder contains the Fe—Si—Cr alloy powder and the carbonyl iron powder. A mass percentage of the Fe—Si—Cr alloy powder in the soft magnet powder is 33%. A mass percent of the Fe—Si—Cr alloy powder is 93.5% of iron (Fe), 4.5% of silicon (Si), and 2% of chromium (Cr). A mass percentage of the carbonyl iron powder in the soft magnet powder is 67%. The granularities of the main magnet powder and the soft magnet powder are the same as the experimental group 1.

In the step S100: the main magnet core is prepared by the main magnet core powder in accordance with the present experimental group, and the residual magnet composite material powder is fabricated by the residual magnet powder in accordance with the present experimental group.

In the step S111: a mass percentage of the UPR in main magnet core glue is 0.3%. A mass percentage of the BADGE in the main magnet core glue is 0.8%. A mass percentage of the BPF in the main magnet core glue is 0.2%. A mass percentage of the cyclohexanone in the main magnet core glue is 5%. A mass percentage of the acetone in the main magnet core glue is 10%. In the step S112: the main magnet core glue is pressed at a pressure of 500 MPa in the main magnet core die to solidify the UPR and form the main magnet core blank.

In the step S113: the main magnet core blank is dried at a temperature of 210° C. for 10 minutes to remove the cyclohexanone and the acetone and further cure the main magnet core.

In the step S121: a mass percentage of the UPR in the residual magnet suspension is 0.15%. A mass percentage of the BADGE in the residual magnet suspension is 0.5%. A mass percentage of the BPF in residual magnet suspension is 0.1%. A mass percentage of the cyclohexanone in the residual magnet suspension is 7%. A mass percentage of the acetone in the residual magnet suspension is 2%.

In the step S123: a mass percentage of the fumed silica in the residual magnet composite material powder is 0.05%, and the granularity of the fumed silica is 15 nm. A mass percentage of the silane coupling agent in the residual magnet composite material powder is 0.1%. in the present experimental group, a thickness of the silica coating layer is 10 nm.

In the step S400: the residual magnet composite material powder is hot-pressed at a pressure of 300 MPa and a temperature of 150° C. in the residual magnet die to integrally form the residual magnet by the residual magnet composite material powder.

In the step S600: a mass percentage of the NMP in the insulation coating material is 90%. A mass percentage of the epoxy resin in the insulation coating material is 8%. A mass percentage of the nano-silicon powder in the insulation coating material is 2%, and the granularity of the nano-silicon powder is 120 nm. In the present experimental group, a thickness of the insulation rust-proof layer is 10 μm.

In the step S700: a thickness of the solder layer formed on the bottom surface of each electrode is 15 μm.

Experimental Group 3

In the experimental group 3, a mass percentage of the amorphous iron base material powder in the main magnet core powder is 80%. A mass percent of the amorphous iron base material powder is 91% of iron (Fe), 4.5% of silicon (Si), 3.75% of boron (B), 0.35% of phosphorus (P), and 0.4% of carbon (C). A mass percentage of the amorphous nickel base material powder in the main magnet core powder is 20%. A mass percent of the amorphous nickel base material powder is 60.5% of nickel (Ni), 28% of iron (Fe), 5% of boron (B), 5% of silicon (Si), and 1.5% of phosphorus (P). The granularities of the amorphous iron base material and the amorphous nickel base material powder are the same as the experimental groups 1 and 2.

A mass percentage of the main magnet powder in the residual magnet powder is 62.5%. A mass percent of the main magnet powder is 77.05% of iron (Fe), 9.5% of nickel (Ni), 4.5% of cobalt (Co), 5% of silicon (Si), 3% of boron (B), 0.6% of phosphorus (P), and 0.35% of niobium (Nb). A mass percentage of the soft magnet powder in the residual magnet powder is 37.5%, and the soft magnet powder contains the Fe—Si—Cr alloy powder and the carbonyl iron powder. A mass percentage of the Fe—Si—Cr alloy powder in the soft magnet powder is 20%. A mass percent of the Fe—Si—Cr alloy powder is 92% of iron (Fe), 5.5% of silicon (Si), and 2.5% of chromium (Cr). A mass percentage of the carbonyl iron powder in the soft magnet powder is 80%. The granularities of the magnet powder and the soft magnet powder are the same as the experimental groups 1 and 2.

In the step S100: the main magnet core is prepared by the main magnet core powder in accordance with the present experimental group, and the residual magnet composite material powder is fabricated by the residual magnet powder in accordance with the present experimental group.

In the step S111: a mass percentage of the UPR in the main magnet core glue is 0.2%. A mass percentage of the BADGE in the main magnet core glue is 1%. A mass percentage of the BPF in the main magnet core glue is 0.3%. A mass percentage of the cyclohexanone in the main magnet core glue is 7%. A mass percentage of the acetone in the main magnet core glue is 7%.

In the step S112: the main magnet core glue is pressed at a pressure of 700 MPa in the main magnet core die to solidify the UPR and form the main magnet core blank.

In the step S113: the main magnet core blank is dried at a temperature of 210° C. for 7 minutes to remove the cyclohexanone and the acetone and further cure the main magnet core.

In the step S121: a mass percentage of the UPR in the residual magnet suspension is 0.1%. A mass percentage of the BADGE in the residual magnet suspension is 0.6%. A mass percentage of the BPF in residual magnet suspension is 0.15%. A mass percentage of the cyclohexanone in the residual magnet suspension is 12%. A mass percentage of the acetone in the residual magnet suspension is 3%.

In the step S123: a mass percentage of the fumed silica in the residual magnet composite material powder is 0.15%, and the granularity of the fumed silica is 20 nm. A mass percentage of the silane coupling agent in the residual magnet composite material powder is 0.25%. in the present experimental group, a thickness of the silica coating layer is 15 nm.

In the step S400: the residual magnet composite material powder is hot-pressed at a pressure of 250 MPa and a temperature of 120° C. in the residual magnet die to integrally form the residual magnet by the residual magnet composite material powder.

In the step S600: a mass percentage of the NMP in the insulation coating material is 92.5%. A mass percentage of the epoxy resin in the insulation coating material is 6%. A mass percentage of the nano-silicon powder in the insulation coating material is 1.5%, and the granularity of the nano-silicon powder is 100 nm. In the present experimental group, a thickness of the insulation rust-proof layer is 15 μm. With the foregoing description of the composition of the insulation coating material in accordance with the experimental groups 1 to 3, due to the amount of the nano-silicon powder in the insulation coating material affecting a viscosity thereof, the insulation rust-proof layer is thinner if the viscosity of the insulation coating material is higher. Therefore, the thickness of the insulation rust-proof material is controlled by adjusting the mass percentage of the nano-silicon powder in the insulation coating material. Furthermore, the nano-silicon powder has a high electrical resistance that achieves an effect of insulation.

In the step S700: a thickness of the solder layer formed on the bottom surface of each electrode is 15 μm.

Control Group

In the control group, the main magnet core is made of a magnet core powder containing a first magnetic material powder and the carbonyl iron powder. A mass percentage of the first magnetic material powder in the magnet core is 59%. A mass percent of the first magnetic material powder is 91% of iron (Fe), 3.5% of silicon (Si), 5% of boron (B), and 0.5% of carbon (C), a granularity of the first magnetic material powder is 25 μm. A mass percentage of the carbonyl iron powder is 41%, and a granularity of the carbonyl iron powder is 4 μm.

The magnet core powder is further mixed with an epoxy resin to form a magnet core granulation powder. A mass percentage of the magnet core powder in the magnet core granulation powder is 98.4%. A mass percentage of the epoxy resin in the magnet core granulation powder is 1.6%. Then, the magnet core granulation powder is disposed into the main magnet core die and is pressed at a pressure of 700 MPa therein to form a main magnet core blank. Afterward, the main magnet core blank is dried at a temperature of 180° C. for 10 minutes to cure and form the main magnet core.

In the control group, the residual magnet is made of a residual magnet powder containing the first magnetic material powder and the carbonyl iron powder as the foregoing description. Therefore, a composition of the residual magnet powder is the same as the composition of the magnet core powder and does not introduce hereinafter.

The residual magnet powder is further mixed with an epoxy resin to form a residual magnet granulation powder. A mass percentage of the residual magnet powder in the residual magnet granulation powder is 99%. A mass percentage of the epoxy resin in the residual magnet granulation powder is 1%. Then, the main magnet core with a coil mounted around and the residual magnet granulation powder are disposed into the residual magnet die and are hot-pressed at a pressure of 300 MPa and by a temperature of 100 to 150° C. Afterward, the residual magnet is formed and at the same time, an inductor is formed.

In the control group, the inductor is dried at a temperature of 180° C. for 4 hours to be further cured. Then, an insulating paint is coated on the inductor and dried. Afterward, two solder layers are respectively formed on a bottom surface of two electrodes of the inductor.

After testing, data of a magnetic permeability and a loss of the main magnet core and the residual magnet in accordance with the experimental groups 1 to 3 and the control group are shown in table 1 as follows. The loss is measured at an operating frequency of 1 MHz and a magnetic flux density of 50 mT.

TABLE 1

| | Element | Magnetic permeability | loss(kW/m$^3$) |
|---|---|---|---|
| Experimental group 1 | Main magnet core | 38 | 5100 |
| | Residual magnet | 37 | 5300 |
| Experimental group 2 | Main magnet core | 37 | 5400 |
| | Residual magnet | 37 | 5600 |
| Experimental group 3 | Main magnet core | 37 | 4700 |
| | Residual magnet | 38 | 5000 |
| Control group | Main magnet core | 35 | 6700 |
| | Residual magnet | 37 | 6500 |

After testing, data of an inductance, a saturation current, quality factor, and an alternating current resistance of the inductor in accordance with the experimental groups 1 to 3 and the control group are shown in table 2 as follows.

TABLE 2

| | Inductance(μH) | Saturation current(A) | Quality factor Q | Alternating current resistance (mΩ) |
|---|---|---|---|---|
| Experimental group 1 | 2.2 | 7.1 | 55 | 16.8 |
| Experimental group 2 | 2.2 | 7.1 | 54 | 16.3 |
| Experimental group 3 | 2.2 | 7.4 | 59 | 15.9 |
| Control group | 2.2 | 6.9 | 39 | 27 |

With reference to table 1 and the experimental groups 1 to 3, by using the amorphous iron base material powder and the amorphous nickel base material powder, the main magnet core of the experimental groups is much easier to be magnetized and demagnetized than the main magnet core of the control group made of a conventional magnetic material. Thus, the loss of the main magnet core is effectively reduced. Furthermore, the magnetic permeability of the main magnet core made of the main magnet core powder matches the magnetic permeability of the residual magnet made of the residual magnet powder. Compared to the inductor made of the conventional magnetic material, the loss of the low-loss inductor is indeed reduced The alternating current resistance is effectively reduced as shown in table 2. Therefore, with reference to table 2 and compared to the conventional inductor, the low-loss inductor made of the main magnet core powder and the residual magnet powder in accordance with the present invention has a higher quality factor (Q), the loss is indeed lowered, and a conversion efficiency is enhanced.

With the foregoing description, the amorphous material powders are much easier to be magnetized and demagnetized than the conventional magnetic materials are, so the main magnet core powder containing the amorphous iron base material powder and the amorphous nickel base material powder have the low-loss characteristic. Therefore, a composition of the main magnet core powder is adjusted to maintain the high magnetic permeability and lower the loss of the main magnet core. Moreover, by the residual magnet powder formed by mixing the main magnet powder with the soft magnet powder and adjusting the composition thereof, the residual magnet having the magnetic permeability matching the magnetic permeability of the main magnet core is fabricated. A magnet leakage because of a magnetic permeability mismatch is avoided so that the loss of the inductor is further lowered, and the conversion efficiency of the low-loss inductor is further enhanced.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An inductor comprising:

a main magnet core including a main magnet core powder containing:

an amorphous iron base material powder, wherein a mass percent of the amorphous iron base material powder is 89.7 to 92.35% of iron (Fe), 4 to 5% of silicon (Si), 3.5 to 4% of boron (B), 0.05 to 0.5% of phosphorus (P), and 0.1 to 0.8% of carbon (C); and an amorphous nickel base material powder, wherein a mass percent of the amorphous nickel base material powder is 60.5 to 67.7% of nickel (Ni), 25 to 28% of iron (Fe), 3.5 to 5% of boron (B), 3.5 to 5% of silicon (Si), and 0.3 to 1.5% of phosphorus (P);

a coil mounted around the main magnet core; and a residual magnet encapsulating the main magnet core, partially encapsulating the coil, and comprising a residual magnet powder containing:

a main magnet powder, wherein a mass percent of the main magnet powder is 72.7 to 83.7% of iron (Fe), 8 to 11% of nickel (Ni), 3 to 5% of cobalt (Co), 3 to 6% of silicon (Si), 2 to 4% of boron (B), 0.2 to 0.8% of phosphorus (P), and 0.1 to 0.5% of niobium (Nb); and a soft magnet powder containing an iron-silicon-chromium alloy power and a carbonyl iron powder, wherein a mass percent of the iron-silicon-chromium alloy powder is 90.5 to 93.5% of iron (Fe), 4.5 to 6.5% of silicon (Si), and 2 to 3% of chromium (Cr).

2. The inductor as claimed in claim 1, wherein a mass percentage of the amorphous iron base material in the main magnet core is 70 to 90%;

a mass percentage of the amorphous nickel base material in the main magnet core is 10 to 30%;

a mass percentage of the main magnet powder in the residual magnet powder is 59 to 67%;

a mass percentage of the soft magnet powder in the residual magnet powder is 33 to 41%;

a mass percentage of the iron-silicon-chromium alloy powder in the soft magnet powder is 17 to 33%; and a mass percentage of the carbonyl iron powder in the soft magnet powder is 67 to 83%.

3. The inductor as claimed in claim 2, wherein a mass percentage of the amorphous iron base material powder in the main magnet core powder is 70%;

the mass percent of the amorphous iron base material powder is 92.35% of iron (Fe), 4% of silicon (Si), 3.5% of boron (B), 0.05% of phosphorus (P), and 0.1% of carbon (C);

a mass percentage of the amorphous nickel base material powder in the main magnet core powder is 30%;

the mass percent of the amorphous nickel base material powder is 60.5% of nickel (Ni), 28% of iron (Fe), 5% of boron (B), 5% of silicon (Si), and 1.5% of phosphorus (P);

a mass percentage of the main magnet powder in the residual magnet powder is 59%;

the mass percent of the main magnet powder contains 83.7% of iron (Fe), 8% of nickel (Ni), 3% of cobalt (Co), 3% of silicon (Si), 2% of boron (B), 0.2% of phosphorus (P), and 0.1% of niobium (Nb); and a mass percentage of the soft magnet powder in the residual magnet powder is 41%, wherein a mass percentage of the iron-silicon-chromium alloy powder in the soft magnet powder is 17%;

the mass percent of the iron-silicon-chromium alloy powder is 90.5% of iron (Fe), 6.5% of silicon (Si), and 3% of chromium (Cr); and a mass percentage of the carbonyl iron powder in the soft magnet powder is 83%.

4. The inductor as claimed in claim 2, wherein a mass percentage of the amorphous iron base material powder in the main magnet core powder is 90%;

the mass percent of the amorphous iron base material powder is 89.7% of iron (Fe), 5% of silicon (Si), 4% of boron (B), 0.5% of phosphorus (P), and 0.8% of carbon (C);

a mass percentage of the amorphous nickel base material powder in the main magnet core powder is 10%;

the mass percent of the amorphous nickel base material powder is 67.7% of nickel (Ni), 25% of iron (Fe), 3.5% of boron (B), 3.5% of silicon (Si), and 0.3% of phosphorus (P);

a mass percentage of the main magnet powder in the residual magnet powder is 67%;

the mass percent of the main magnet powder is 72.7% of iron (Fe), 11% of nickel (Ni), 5% of cobalt (Co), 6% of silicon (Si), 4% of boron (B), 0.8% of phosphorus (P), and 0.5% of niobium (Nb); and a mass percentage of the soft magnet powder in the residual magnet powder is 33%, wherein a mass percentage of the iron-silicon-chromium alloy powder in the soft magnet powder is 33%;

the mass percent of the iron-silicon-chromium alloy powder is 93.5% of iron (Fe), 4.5% of silicon (Si), and 2% of chromium (Cr); and a mass percentage of the carbonyl iron powder in the soft magnet powder is 67%.

5. The inductor as claimed in claim 2, wherein a mass percentage of the amorphous iron base material powder in the main magnet core powder is 80%;

the mass percent of the amorphous iron base material powder is 91% of iron (Fe), 4.5% of silicon (Si), 3.75% of boron (B), 0.35% of phosphorus (P), and 0.4% of carbon (C);

a mass percentage of the amorphous nickel base material powder in the main magnet core powder is 20%;

the mass percent of the amorphous nickel base material powder is 60.5% of nickel (Ni), 28% of iron (Fe), 5% of boron (B), 5% of silicon (Si), and 1.5% of phosphorus (P);

a mass percentage of the main magnet powder in the residual magnet powder is 62.5%;

the mass percent of the main magnet powder is 77.05% of iron (Fe), 9.5% of nickel (Ni), 4.5% of cobalt (Co), 5% of silicon (Si), 3% of boron (B), 0.6% of phosphorus (P) and 0.35% of niobium (Nb); and a mass percentage of the soft magnet powder in the residual magnet powder is 37.5%, wherein a mass percentage of the iron-silicon-chromium alloy powder in the soft magnet powder is 20%;

the mass percent of the iron-silicon-chromium alloy powder is 92% of iron (Fe), 5.5% of silicon (Si), and 2.5% of chromium (Cr); and a mass percentage of the carbonyl iron powder in the soft magnet powder is 80%.

6. The inductor as claimed in claim 1, wherein the residual magnet further comprises a silica.

7. The inductor as claimed in claim 6 further comprising an insulation rust-proof layer formed on an outer surface of the residual magnet.

8. The inductor as claimed in claim 7, wherein the insulation rust-proof layer comprises:

an epoxy resin with a mass percentage of 80% in the insulation rust-proof layer; and a nano-silicon powder with a mass percentage of 20 in the insulation rust-proof layer.

9. The inductor as claimed in claim 8, wherein the main magnet core comprises:

a main pillar having:

a base integrally extending from an end of the main pillar; and two concave portions respectively protruding from two opposite sides of the base; and a central pillar encapsulated by the main pillar and mounted inside an upper portion of the main pillar;

the coil comprises:

a winding portion sleeved on the main pillar of the main magnet core; and two end portions respectively bent and fastened on two sides of the concave portions of the base to integrally form two electrodes, wherein a solder layer is formed on a bottom surface of each electrode; and the solder layers and the electrodes are exposed from the residual magnet.

10. The inductor as claimed in claim 9, wherein a thickness of the insulation rust-proof layer is 10 to 20 μm; and a thickness of the solder layer is 15 to 25 μm.

11. A manufacturing method of an inductor comprising steps of:

(a) preparing a main magnet core and fabricating a residual magnet composite material powder, wherein the main magnet core contains a main magnet core powder containing:

an amorphous iron base material powder, wherein a mass percent of the amorphous iron base material powder is 89.7 to 92.35% of iron (Fe), 4 to 5% of silicon (Si), 3.5 to 4% of boron (B), 0.05 to 0.5% of phosphorus (P), and 0.1 to 0.8% of carbon (C); and an amorphous nickel base material powder, wherein a mass percent of the amorphous nickel base material powder is 60.5 to 67.7% of nickel (Ni), 25 to 28% of iron (Fe), 3.5 to 5% of boron (B), 3.5 to 5% of silicon (Si), and 0.3 to 1.5% of phosphorus (P); and the residual magnet composite material powder contains a residual magnet powder containing:

a main magnet powder, wherein a mass percent of the main magnet powder is 72.7 to 83.7% of iron (Fe), 8 to 11% of nickel (Ni), 3 to 5% of cobalt (Co), 3 to 6% of silicon (Si), 2 to 4% of boron (B), 0.2 to 0.8% of phosphorus (P), and 0.1 to 0.5% of niobium (Nb); and a soft magnet powder containing an iron-silicon-chromium alloy power and a carbonyl iron powder, wherein a mass percent of the iron-silicon-chromium alloy powder is 90.5 to 93.5% of iron (Fe), 4.5 to 6.5% of silicon (Si), and 2 to 3% of chromium (Cr);

(b) mounting a coil around the main magnet core;

(c) disposing the main magnet core with the coil mounted around and the residual magnet composite material powder into a first die, wherein the residual magnet composite material powder encapsulates the main magnet core and partially encapsulates the coil;

(d) hot-pressing the residual magnet composite material powder by the first die to form a residual magnet; and (e) removing the residual magnet from the first die to have an inductor.

12. The manufacturing method as claimed in claim 11, wherein a mass percentage of the amorphous iron base material in the main magnet core is 70 to 90%;

a mass percentage of the amorphous nickel base material in the main magnet core is 10 to 30%;

a mass percentage of the main magnet powder in the residual magnet powder is 59 to 67%;

a mass percentage of the soft magnet powder in the residual magnet powder is 33 to 41%;

a mass percentage of the iron-silicon-chromium alloy powder in the soft magnet powder is 17 to 33%; and a mass percentage of the carbonyl iron powder in the soft magnet powder is 67 to 83%.

13. The manufacturing method as claimed in claim 11, wherein the step (a) further comprises steps of:

(a1) mixing the main magnet core with an adhesive and a solvent to form a main magnet core glue;

(a2) injecting the main magnet core glue into a second die, and integrally forming a main magnet core blank; and (a3) drying the main magnet core blank at a temperature of 210° C. for 5 to 10 minutes to remove the solvent and further cure the main magnet core.

14. The manufacturing method as claimed in claim 13, wherein the step (a) further comprises steps of:

(a4) mixing the residual magnet powder with an organic resin and a solvent to form a residual magnet suspension;

(a5) drying the residual magnet suspension to remove the solvent and form the residual magnet composite material powder; and (a6) mixing the residual magnet composite material powder with a fumed silica and a silane coupling agent to form a silica coating layer on a surface of the residual magnet composite material powder, wherein a mass percentage of the fumed silica in the residual magnet composite material powder is 0.05 to 0.2%; and a mass percentage of the silane coupling agent in the residual magnet composite material powder is 0.1 to 0.5%.

15. The manufacturing method as claimed in claim 14, wherein in the step (a2), the main magnet core glue is pressed in the second die by a pressure of 500 to 900 MPa to solidify the adhesive and integrally form the main magnet core.

16. The manufacturing method as claimed in claim 15, wherein in the step (e), the residual magnet composite material powder is hot-pressed in the first die by a pressure of 150 to 300 MPa and a temperature of 100 to 150° C. to integrally form the residual magnet.

17. The manufacturing method as claimed in claim 16, wherein after the step (e) further comprises a step of: (0, coating an insulation coating material on the residual magnet and then drying insulation coating material to form an insulation rust-proof layer.

18. The manufacturing method as claimed in claim 17, wherein in the step (a2), a central pillar is further disposed in the first die, is located at an upper portion of the first die, and is encapsulated by the main magnet core glue; and in the step (b), a winding portion of the coil is sleeved on a main pillar of the main magnet core, and two end portions of the coil are bent and fastened on a base of the main magnet core to form two electrodes.

19. The manufacturing method as claimed in claim 18, wherein after the step (f) further comprises a step of: (g) forming a solder layer on a bottom surface of each electrode, wherein a thickness of the solder layer is 15 to 25 μm.

* * * * *